(12) United States Patent
Golander et al.

(10) Patent No.: US 10,489,346 B2
(45) Date of Patent: Nov. 26, 2019

(54) ATOMIC UPDATE OF B-TREE IN A PERSISTENT MEMORY-BASED FILE SYSTEM

(71) Applicant: NETAPP, INC., Sunnyvale, CA (US)

(72) Inventors: Amit Golander, Tel-Aviv (IL); Boaz Harrosh, Tel-Aviv (IL); Sagi Manole, Petach-Tikva (IL)

(73) Assignee: NETAPP, INC., Sunnyvale, CA (US)

( * ) Notice: Subject to any disclaimer, the term of this patent is extended or adjusted under 35 U.S.C. 154(b) by 841 days.

(21) Appl. No.: 15/158,642

(22) Filed: May 19, 2016

(65) Prior Publication Data

US 2017/0177644 A1 Jun. 22, 2017

Related U.S. Application Data

(60) Provisional application No. 62/267,951, filed on Dec. 16, 2015.

(51) Int. Cl.
*G06F 16/13* (2019.01)
(52) U.S. Cl.
CPC .................... *G06F 16/13* (2019.01)
(58) Field of Classification Search
USPC .................................................. 707/743, 822
See application file for complete search history.

(56) References Cited

U.S. PATENT DOCUMENTS

| 5,283,894 A | 2/1994 | Deran |
| 5,870,757 A | 2/1999 | Fuller |
| 5,937,425 A | 8/1999 | Ban |
| 10,108,624 B1* | 10/2018 | Vermeulen ............ G06F 16/122 |
| 2007/0067321 A1* | 3/2007 | Bissett .................. G06F 9/4488 |
| 2010/0106754 A1* | 4/2010 | Condit ................ G06F 12/0804 707/822 |
| 2014/0006701 A1* | 1/2014 | Condit ................ G06F 12/0804 711/105 |
| 2017/0177447 A1 | 6/2017 | Golander et al. |

* cited by examiner

*Primary Examiner* — Cam Linh T Nguyen
(74) *Attorney, Agent, or Firm* — Klein, O'Neill & Singh, LLP

(57) ABSTRACT

A computer implemented method for updating a file system tree structure through an atomic operation, comprising one or more hardware processor adapted for designating a file system comprising a plurality of files arranged in a plurality of tree structures, the file system is based on a direct mapping persistent memory, receiving instructions from a client to alter an altered file of the plurality of files, creating an alternate tree structure to apply the alteration in case the alteration involves a non-atomic tree structure operation to an original tree structure of the plurality of tree structures containing the altered file and committing the alteration to the file system through an atomic operation.

25 Claims, 8 Drawing Sheets

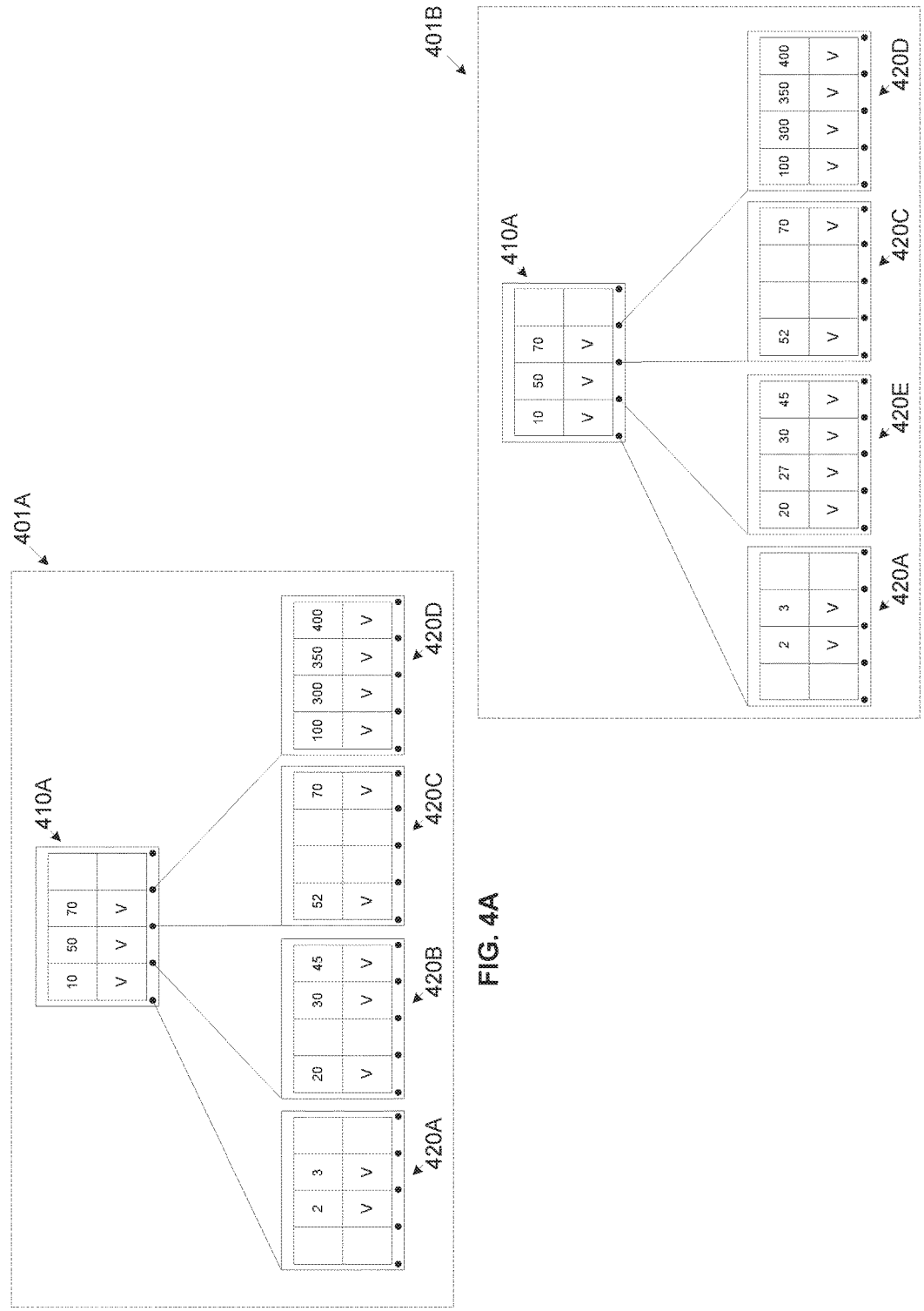

ATOMIC UPDATE OF B-TREE IN A PERSISTENT MEMORY-BASED FILE SYSTEM

RELATED APPLICATION

This application claims the benefit of U.S. Provisional Application No. 62/267,951 filed on Dec. 16, 2015, the contents of which are incorporated herein by reference in their entirety.

BACKGROUND

The present invention, in some embodiments thereof, relates to updating tree structures constituting a persistent memory file system and, more specifically, but not exclusively, updating tree structures constituting a persistent memory file system through an atomic operation.

Data storage is one of the major building blocks of the modern technology as everything is about data. One of the challenges every data storage system, product and/or platform is facing is the need to provide a robust crash immune data management environment while maintaining high access rates and data store/retrieval performance. Crash immunity is essential to verify the consistency of a data storage system to assure data integrity and/or avoid data loss in the event of an improper shutdown of the data storage system, for example, a system crash, a system hang and/or a power loss that may occur during one or more operations to the data storage system.

The improper shutdown events when the file system is improperly unmounted may lead to intermittent states within the file system resulting from file operation that were not fully completed and committed to the file system prior to the improper shutdown. To overcome such scenarios multiple techniques are used for implementing a robust file system, for example, physical media scan and fix following the improper unmount (disk check), journaling and/or the likes.

Most file systems are arranged in tree like structures, for example, binary Trees, B-Trees, B+Trees, B*Trees and/or the like allowing fast file search, sort and/or access operations. The tree structures must be properly maintained at all times and conditions to verify their consistency in order to avoid data loss in the file system.

The robust file systems employ different techniques, for example, disk check and/or journaling for tracking the tree structures arrangement and/or file changes in order to make sure intermittent states in each of the tree structures are detected and managed to verify their deterministic state at all times and thus the deterministic state of the entire file system.

SUMMARY

According to some embodiments of the present invention, there is provided a computer implemented method for updating a file system tree structure through an atomic operation, comprising at least one hardware processor adapted for:

Designating a file system comprising a plurality of files arranged in a plurality of tree structures. The file system is based on a direct mapping persistent memory.

Receiving instructions from a client to alter an altered file of the plurality of files.

Creating an alternate tree structure to apply the alteration in case the alteration involves a non-atomic tree structure operation to an original tree structure of the plurality of tree structures containing the altered file.

Committing the alteration to the file system through an atomic operation.

The persistent memory comprises one or more powered-up non-volatile dual in-line memory module (NVDIMM).

The plurality of tree structures are B-Trees.

An order of each of a plurality of elements constituting each of the plurality of tree structures is adapted according to a hardware architecture of the persistent memory and/or a hardware architecture of the one or more hardware processors. The order is indicative of a size of each element.

The hardware architecture of the one or more hardware processor relates to a width of a register and/or a width of a cache line.

The hardware architecture of the persistent memory relates to an elementary block size of the persistent memory.

The order of each element is adapted to order of 4 such that each element comprises 4 pointer-key pairs.

Each of the plurality of files is a member selected from a group consisting of a file, a directory, a link to a file and/or a link to a directory.

The alteration involves one or more file operation. The one or more file operations may be create, link, remove, delete, unlink, merge and/or split.

The alternate tree structure is created in a reserved area of the file system. The reserved area is not accessible by the client.

The alternate tree structure is linked to unaltered files contained in the original tree structure.

Optionally, the one or more processors flush to the persistent memory data comprising the alternate tree structure following the creation.

The alternate tree structure is committed to the file system by re-assigning a pointer pointing to the original tree structure to point to the alternate tree structure. The pointer re-assignment is an atomic operation uninterruptable by other operations in the file system.

Optionally, the one or more processors flush to the persistent memory data comprising the atomic operation as part of the commit.

Optionally, the one or more processors create a resources dataset during a mount sequence of the file system by analyzing the plurality of tree structures. Based on the analysis the alternate tree structure is committed to the file system in case the alteration completed successfully prior to a latest unmount sequence or the alternate tree structure is discarded and not committed to the file system in case the alteration failed to complete prior to the unmount sequence.

Optionally, the resources dataset resides in a volatile memory comprising one or more volatile memory devices.

According to some embodiments of the present invention, there is provided a persistent memory based file system, comprising a persistent memory storage, a program store storing a code and one or more hardware processors coupled to the storage and the program store. The one or more hardware processors are adapted to execute the code, the code comprising:

Code instructions to designate a file system comprising a plurality of files arranged in a plurality of tree structures.

Code instructions to receive instructions from a client to alter an altered file of the plurality of files.

Code instructions to create an alternate tree structure to apply the alteration in case the alteration involves a non-atomic tree structure operation to an original tree structure of the plurality of tree structures containing the altered file.

Code instructions to commit the alteration to the file system through an atomic operation.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4A is a schematic illustration of an exemplary file system B–Tree structure prior to an update through a simple atomic operation, according to some embodiments of the present invention;

FIG. 4B is a schematic illustration of an exemplary file system B–Tree structure following an update through an atomic operation, according to some embodiments of the present invention;

DETAILED DESCRIPTION

Figure 1:
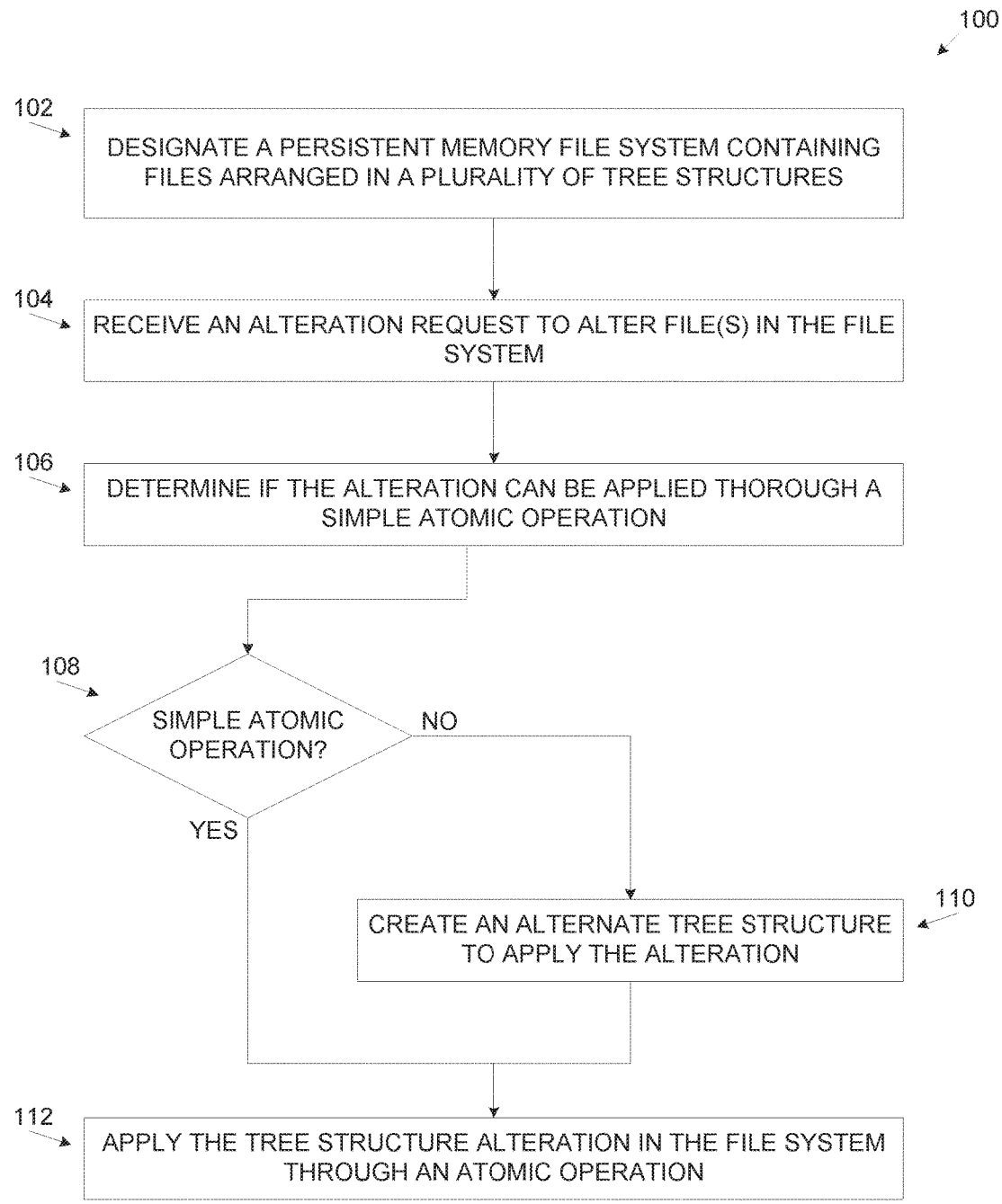
FIG. 1 is a flowchart of an exemplary process for updating a tree structure mapping a file system through an atomic operation, according to some embodiments of the present invention.

The present invention, in some embodiments thereof, relates to updating tree structures constituting a persistent memory file system and, more specifically, but not exclusively, updating tree structures constituting a persistent memory file system through an atomic operation.

According to some embodiments of the present invention, there are provided systems, methods and computer programs for updating tree structures of a file system through atomic operations such that alterations to the file system structure resulting from file operations to the file system file are committed to the file system through an uninterruptable atomic operation. While multiple alterations may be applied to the file system each through an atomic operation, for brevity a single change is described hereinafter in which a single requested alteration is applied in the file system through a single atomic operation. File systems are typically mapped through a plurality of tree structures, for example, a binary Tree, and more specifically, self-balancing tree structures, for example, a B–Tree, a B+Tree, a B*Tree and the like. The tree structures may present logarithmic access timing compared to other (flat) structures and are therefore widely used for file systems to support fast and rapid file search, sort and access operations. The file system tree structures are arranged in a top down tree construction where a root element of the tree structure is pointing to lower level elements of the tree structure thus creating branches that may further propagate through additional levels all the way to leaf elements at the bottom most level of the tree structure. Each of the elements consists of several pointer-key pairs where the pointer is a pointer and/or an address of an inode and the key value is used to map and/or designate the tree structure elements for efficiently navigating and/or traversing through the tree structure. In some embodiments, the pointer may include the inode itself and/or part thereof. Each inode is associated with a file in the file system, for example, a file, a directory, a link to a file and/or a link to a directory.

Due to the inherent structure of the tree structures, and more over of self-balancing trees, the file operation(s) to one or more altered files, for example, create, move, erase, delete, rename, link, unlink and the like may require changing one of the tree structures and/or a part thereof to accommodate the requested alteration. In order to maintain the robust file system capable of maintaining consistency of all files at all times, and specifically during events of improper unmount of the file system, the changes(s) to the tree structure must be conducted such that the state of all the tree structures constituting the file system is deterministic at all times. The improper unmount events may be the result of, for example, a system crash, a system hang, unclean shutdown and/or a power loss.

As presented in the present invention, committing the change(s) of the tree structure constituting the file system is conducted through an uninterruptable atomic operation that may not be interrupted by other file system operations and may therefore be considered as a single operation. The atomic operation may therefore be discarded in case of failure of the respective file alteration(s) inducing the change (s) to the tree structure(s) or committed to the file system in case of successful completion of the file alteration(s) inducing the change(s).

Some changes to the tree structure(s) may be atomic by nature, for example, an operation to add an inode to an existing element that has a free pointer-key pair space. However, other changes to the tree structures are more complex and may require, for example, adding element(s), splitting element(s), removing element(s), merging elements, adding levels and/or the like. The complex changes involve a non-atomic operation to the file system tree structure(s) composed of several file system actions. The complex changes may therefore not be conducted through a single file system operation. To commit the complex changes into the file system in an atomic operation, the requested alteration may be applied in an alternate tree structure. The alternate tree structure is identical to an original tree structure and/or part thereof that include the altered file(s). The alternate tree structure is created to include the changed segment(s) of the original tree structure. The changed segment(s) are the tree segments that need to be changed in order to accommodate the file alteration(s). The alternate tree structure may further include pointers to unchanged segments in the original tree structure that are not affected by the requested alteration. The alternate tree structure is created in a dedicated reserved storage space in the file system that is not accessible to external processes, threads, applications and/or utilities accessing the file system. After the alternate tree structure is fully constructed, a pointer pointing to the root of the original tree structure is re-assigned to point to the root of the alternate tree structure. The re-assignment is executed as an atomic operation. Since the original tree structure itself is not altered during the construction of the alternate tree structure, the original tree structure may be available to one or more read accesses issued by the one or more processes, threads, applications and/or utilities even during construction of the alternate tree structure.

Optionally, during every mount sequence to the file system, the tree structures are checked to reclaim space occupied by alternate tree structures that are not committed into the file system and/or original tree structures that were replaced by the alternate tree structures but were not freed due to an improper unmount event.

Using existing and/or emerging high-speed persistent memory technologies and/or architectures may greatly benefit the file system management through the atomic operations. The high-speed persistent memory, for example, power backed-up non-volatile dual in-line memory modules (NVDIMM-N) that comprise memory-mapped devices provide high-speed and may be used to store the tree structures mapping and/or constituting the file system. The tree structures elements may be adapted such that their structure optimally fits the operational characteristics of the high-speed persistent memory devices, for example, memory width, block size, and/or erasable block size in order to reduce wear-out of the persistent memory. The tree structures elements may be further adapted to fit optimally a cache line width of one or more processors managing the file system.

Deploying file systems managed through the atomic operations may present significant benefits compared to currently existing file systems, for example, journaled file system (JFS), new technology file system (NTFS) and/or third extended filesystem (ext3). While non-journaling legacy file systems may require extensive time to recover from the improper unmounting, the journaling legacy file systems may suffer major performance penalties due to the serialization bottleneck involved in serially logging in the journal each change in the file system before allowing another change to the file system. By committing the alteration to the file system through the atomic operation, the consistency of the file system may become inherent by the architecture and/or implementation of the file system may reduce and/or avoid all together the journaling and/or bookkeeping for tracking changes to the tree structures and/or inodes.

Moreover, as opposed to the legacy file systems, the atomic operations based robust file system allows read accesses to file system segment(s) (tree structures) even while these segment(s) are being changed to accommodate one or more previous file operations. This is possible since the alternate tree structure construction is performed in the dedicated reserved file system area and is only committed back to the file system after it is completely done. Furthermore, taking advantage of the high-speed persistent memory and adapting the file system elements to fit optimally the hardware characteristics of the persistent memory and/or the architecture of the processor(s) managing the file system, extremely high performance may be achieved using the atomic operations based robust file system.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, and the like.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, and the like, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of an exemplary process for updating a tree structure mapping a file system through an atomic operation, according to some embodiments of the present invention. A process 100 for updating one or more tree structures mapping a robust file system through uninterruptable atomic operations makes the file system inherently robust and capable of maintain data and/or structure consistency at all times and specifically, during improper unmount events, for example, a system crash, a system hang, unclean shutdown and/or a power loss. Applying each change to the file system through the atomic operation may allow avoiding use of journaling and/or other bookkeeping mechanisms that may be otherwise required to log the changes to the tree structure(s) in order to allow recovery in the event of the improper unmount of the file system.

While the process 100 may be used for file systems employing different tree structures, and more specifically, self-balancing tree structures, for example, B–Trees, B+Trees, B*Trees and/or the like for brevity the description hereinafter focuses on B–Trees however it may apply to any of the other tree structures. Optionally, the leaf elements of the B–Tree(s) are tagged as is done for B–Tree+ to support more efficient traversing through the B–Tree(s). When a client accessing the file system 210, for example, an application, a process, a thread and/or the like the B–Tree(s) leafs may be presented as they appear in the volatile memory 204. While this presentation may be arbitrary but may consistent with the actual arrangement of the B–Tree(s) as long as the B–Tree(s) is not modified.

Figure 2:
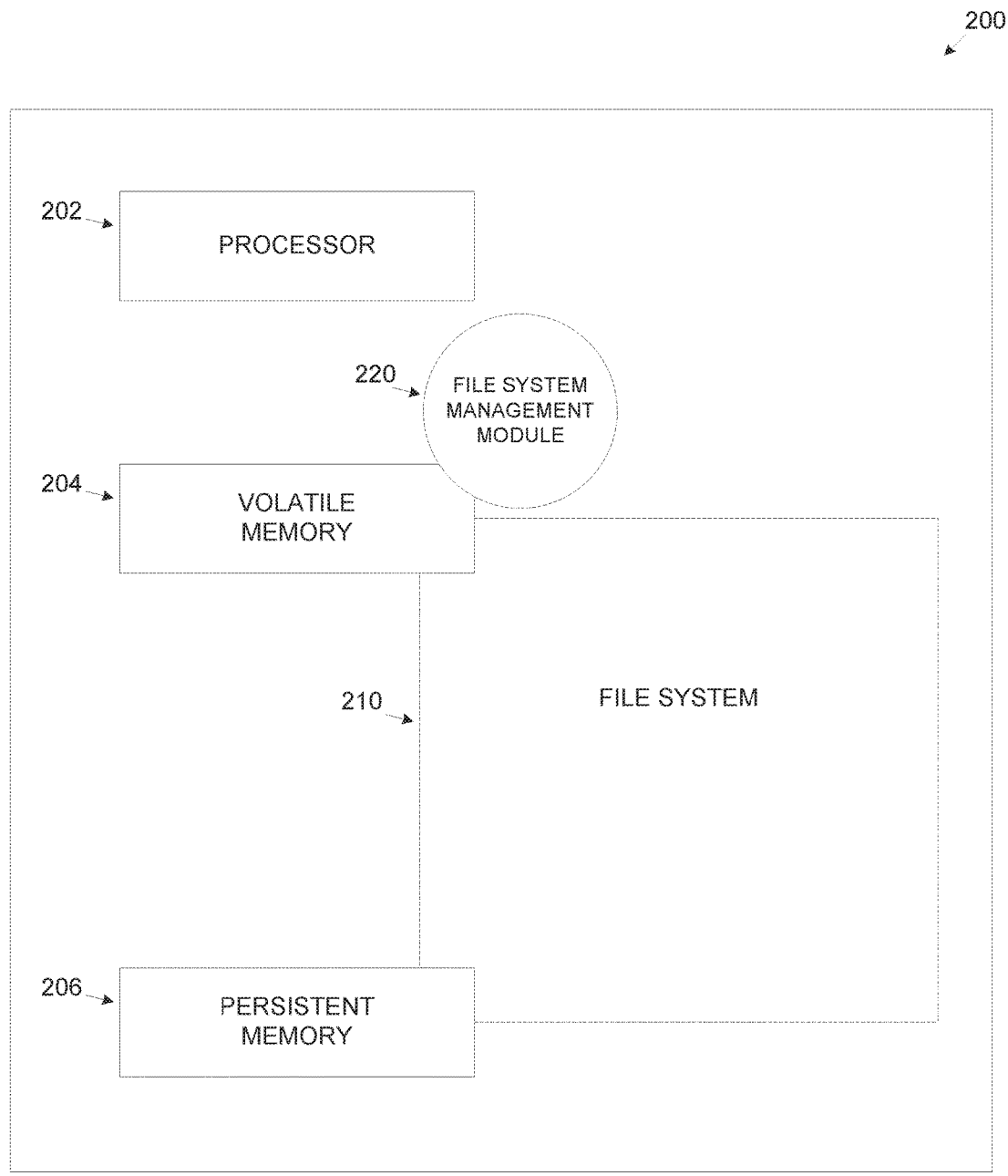
FIG. 2 is a schematic illustration of a first exemplary embodiment of a system for updating a tree structure mapping a file system through an atomic operation, according to some embodiments of the present invention.

Reference is now made to FIG. 2, which is a schematic illustration of a first exemplary embodiment of a system for updating a tree structure mapping a file system through an atomic operation, according to some embodiments of the present invention. A system 200 includes a processor(s) 202, a volatile memory 204 coupled to the processor(s) 202 for executing software modules code, for example, a file system management module 220 and a persistent memory 206 for hosting a file system 210. The processor(s) 202, homogenous or heterogeneous, may be arranged for parallel processing, as clusters and/or as one or more multi core processor(s). The management module 220 may be implemented through one or more software modules, for example, a utility, a software application, an operating system (OS) service and/or the like.

Wherein a module refers to a plurality of program instructions stored in a non-transitory medium and executed by one or more processors and/or one or more cores of one or more processors such as the processor(s) 202. The persistent memory 206 comprises one or more NVDIMM-N devices that are direct memory mapped, accessible on byte basis as opposed to other non-volatile memory device, for example, Flash memory device that are block addressable device.

The persistent memory 206 may include other types of direct memory mapped non-volatile memory devices, for example, NVDIMM-P, NVDIMM-F and/or the like, however for brevity, NVDIMM-N that may be currently most suitable for the atomic operation file system implementation is presented hereinafter. The NVDIMM devices may comprise a power backup source, for example, a capacitor and/or a battery for maintaining power to the NVDIMM during a power loss event. The direct memory mapping of the NVDIMM-N device(s) allows for extremely high data access since the need to erase blocks prior to writing and/or modifying data is avoided. Furthermore, there is no need to access the NVDIMM-N device(s) through large volatile buffers as is done for other mass storage devices, for example HDD, SSD and/or NAND Flash arrays.

The file system 210 is mapped, arranged and/or constructed through tree structure(s), for example, binary trees, B–Trees, B+Trees, B*Trees and/or the like. Each of the tree structure(s) is composed of a plurality of tree elements arranged in level and branches. Each tree element includes one or more pointer-key pairs that are used to map the plurality of inodes of the file system 210. The pointer is a pointer and/or an address of the inode. Optionally, the pointer field may include the inode itself and/or part thereof. The key value is a numeric identifier used to map and/or designate the tree structure elements for efficiently navigating and/or traversing through the tree structures. Each inode is associated with a file in the file system 210, for example, a file, a directory, a link to a file and/or a link to a directory. As discussed before, the file system 210 may be arranged and/or mapped through one or more types of tree structure(s), for example, binary tree, B–Tree, B+Tree, B*Tree and/or the like, however for brevity, the description herein focuses on the B–Tree implementation.

The B–Tree elements may be constructed and/or adapted for different orders, where an order defines the number of pointer-key pairs included in each tree element. The order of the tree elements may be adapted to provide best performance by fitting optimally the hardware architecture of the processor(s) 202, for example, a register size and/or a cache width and/or the like. The order of the tree elements may be adapted further adapted according to one or more characteristics of the hardware architecture of the persistent memory 204, for example, a width of the NVDIMM-N devices memory array and/or a size of an elementary block size and/or the like. The elementary block size indicates a minimal usable and/or erasable persistent memory block. An access equation 1 below may formulate the optimal B-Tree order to match the processing platform architecture and/or the persistent memory architecture.

$$\text{order} = \text{min\_persistency\_size}/\text{RoundupToPowerOf2}(|\text{pointer-key pair}| + |\text{max\_atomicity\_size}|) \qquad \text{Equation 1:}$$

where min_persistency_size is the cache line size, max_atomicity_size is the processor register size and the pointer-key pair is the data size of the pointer-key pairs in the B-Tree elements.

Current processing platforms such as, for example, an Intel Architecture (IA) 64-bit processing platform such as, for example, Intel XEON E5-26xx v2 utilize a cache line size of 64 bytes and a register size of 8 bytes. Current NVDIMM-N architecture employs block size of 8 bytes. The B-Tree pointer-key pair size may be 8 bytes. Applying the values above where the cache_line_size (min_persistency_size) is 64 bytes and the register_size (max_atomicity_size) is 8 bytes results in the order four (4) being the optimal order for the B-Tree elements as formulated in equation 2 below.

$$\text{order} = |\text{cache\_line\_size}|/\text{RoundupToPowerOf2}(|\text{pointer-key pair}| + |\text{register\_size}|) = 64 \text{ bytes}/$$
$$\text{RoundupToPowerOf2}(8 \text{ bytes} + 8 \text{ bytes}) = 64/16 = 4 \qquad \text{Equation 2:}$$

The order four (4) may be the optimal order for the B-Tree since 4 pointer-key pairs comprising a complete element of the B-Tree may be loaded to the 64-bit processing platform in a single access to the one or more NVDIMM-N devices thus the order four (4) is the optimal order for the B-Tree(s).

It should be noted that other orders of the B-Tree elements may be selected to optimize performance for system(s) employing other architectures of the hardware processing platforms and/or of the non-volatile memory architecture (for example, the NVDIMM-N architecture). For example, the order of the B-Tree may adjusted to have optimal sizes of the tree elements to fit other cache line size(s) of current and/or future processing platforms.

Figure 3:
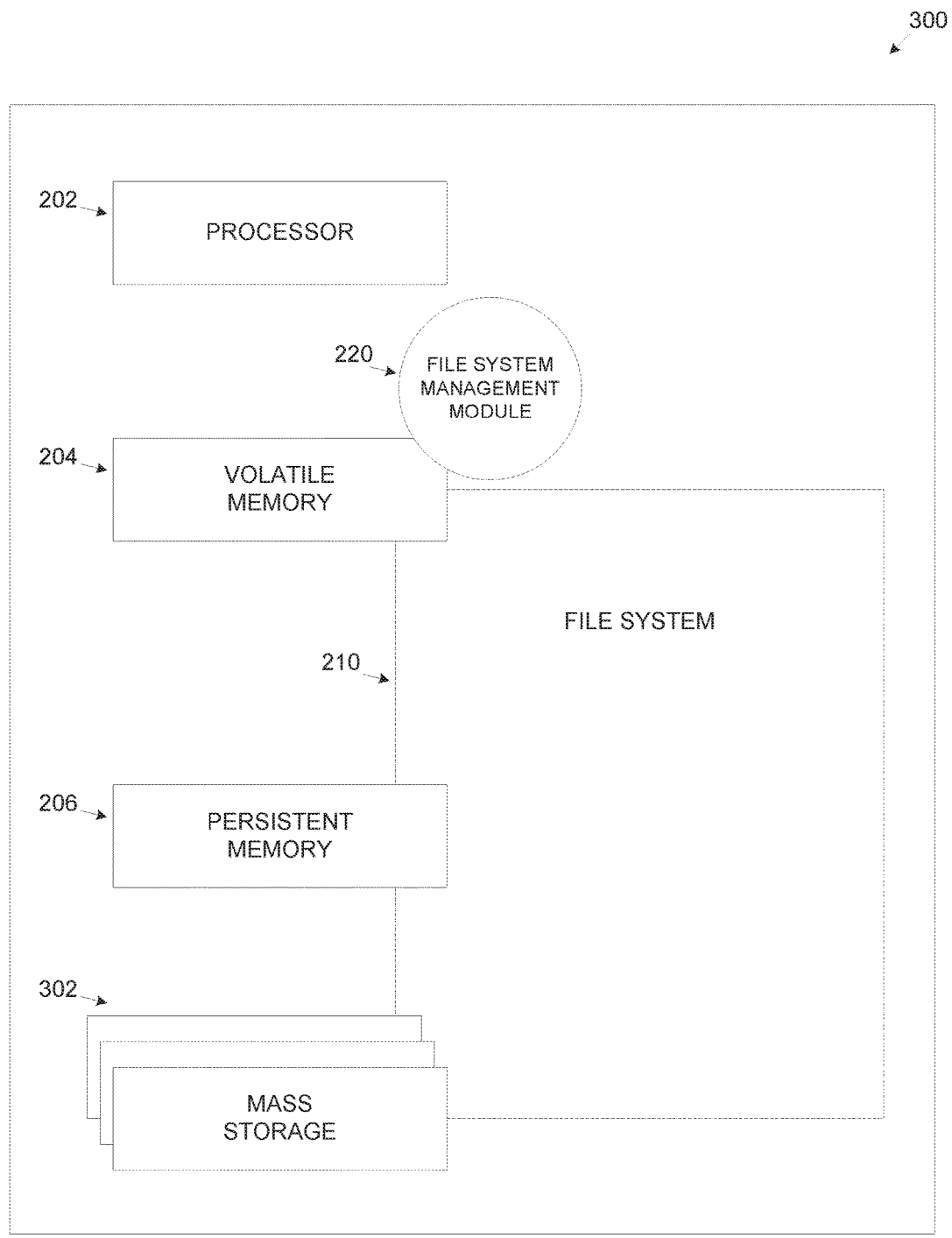
FIG. 3 is a schematic illustration of a second exemplary embodiment of a system for updating a tree structure mapping a file system through an atomic operation, according to some embodiments of the present invention.

Reference is also made to FIG. 3, which is a schematic illustration of a second exemplary embodiment of a system for updating a tree structure mapping a file system through an atomic operation, according to some embodiments of the present invention. A system 300 is identical to a system such as the system 200 having the processor(s) 202, the volatile memory 204 and the persistent memory 206 with an addition of a mass storage 302. The mass storage 302, for example, a magnetic hard drive (HDD), a solid-state drive (SSD), a Flash memory array and/or the like may be used for hosting data, i.e. files content of a file system such as the file system 210. The mass storage 302 may further comprise one or more network storage devices, for example, a storage server, a network accessible storage (NAS) a network drive, and/or the like. While the mass storage 302 may store the data of the file system 210, the tree structures mapping and/or constituting the file system 210 are maintained and managed in the persistent memory 206. The mass storage 302 may also perform as a program store for storing one or more software modules such as, for example, the management module 220.

Reference is made once again to FIG. 1. As shown at 102, the process 100 that may be executed by a system such as the system 200 and/or 300 starts with a management module such as the management module 220 designating a file system such as the file system 210. By designating, it is meant that the management module 220 may mount an existing file system 210 and/or the management module 220 may create a previously non-existing file system 210 and mount it. Once again, as discussed before, the file system 210 may be arranged and/or mapped through one or more types of tree structure(s), for example, binary tree, B-Tree, B+Tree, B*Tree and/or the like, however for brevity, the description herein focuses on B-Trees implementation. The B-Tree structure(s) maps a plurality of inodes each associated with a respective one of the files in the file system 210. During the mount sequence, the management module 220 discovers the file system 210 by exploring and/or traversing through the B-Tree(s).

As shown at 104, the management module 220 receives an alteration request comprising one or more alteration instructions to alter one or more altered files of the plurality of files in the file system 210. The alteration request may be received from one or more clients, for example, a user, an application, a utility, a service, a process, a thread and/or a remote session. The alteration request may require execution of one or more file operations to the altered file(s), for example, create, move, erase, delete, rename, link, unlink and/or the like.

As show at 106, the management module 220 determines whether the file operation(s), required to apply the requested alteration, may be applied to the file system 210 through a simple atomic operation. The atomic operation is an uninterruptable operation to the file system 210 that may not be interrupted by other operations to the file system 210. The atomic operation may therefore be either fully completed and/or regarded as never taking place at all, specifically when the atomic operation is executed during an improper unmount event. In case the atomic operation is completed prior to the improper unmount the change(s) may be committed to the file system 210. In case the atomic operation failed to complete prior to the improper unmount, the change(s) may be discarded. In either case, the consistency of the file system 210 is maintained, as the state is always deterministic. Some of the file system operations (for applying the requested alteration) may be atomic by nature, i.e. simple atomic operations, while other operations (complex changes) may require additional steps, for example, creating an alternate B-Tree and/or part thereof to add, split, merge and/or remove one or more elements 410 and/or 420. The simple atomic operation is atomic by nature such that the management module 220 may apply the requested alteration in the file system 210 without other file system operation(s) interfering with the sequence of the simple atomic operation.

The simple atomic operation may refer to scenarios where the requested alteration (i.e. file operation(s)) does not inflict a structural change to the B-Tree(s) of the file system 210. Rather the requested alteration may be applied by updating one or more existing tree elements of the B-Tree(s) of the file system 210. For example, an operation to add a file, i.e. an inode to an existing B-Tree element that has a free pointer-key pair space at the appropriate slot. The complex changes typically involve non-atomic operations to the tree structure(s) of the file system 210 requiring several file system actions, for example, the additional steps. The management module 220 may therefore not be able to handle the complex changes the same way as the simple atomic operations since one or more other file system operations may take place in between the file system non-atomic operations required to apply the requested alteration in the file system 210.

As shown at 108, which is a decision point based on the determination at step 106, in case the alteration request may be executed through the simple atomic operation, the process 100 branches to 112. In case the alteration request may not be performed through the simple atomic operation, the process 100 branches to 110.

As shown at 110, in order to apply the requested alteration in the file system 210, the management module 220 needs to change construction of one or more B-Tree(s) and/or part thereof such that the management module 220 may use an atomic change to modify the B-Tree(s). The management module 220 may apply the alteration by creating an alternate tree structure that includes one or more new leaf and/or non-leaf elements (delta) to apply the requested alteration and/or for the balancing operations. The management module 220 may create the alternate tree structure in the background using a dedicated reserved storage space of the file system 210 that is not accessible to external processes, threads, applications and/or utilities accessing the file system 210. The management module 220 may crate the alternate trees structure such that it only includes new and/or modified leaf and/or non-leaf elements (delta) and maintains link(s) to one or more leaf and/or non-leaf elements of the original tree structure that are not altered and/or changed as result of the requested alteration.

After the management module 220 creates the alternate tree structure, i.e. constructs the new elements in the dedicated reserved storage space, the management module 220 pushes the data comprising the new elements into the persistent memory 206. This is done to verify that none of the data comprising the new elements (delta) remains in the volatile memory and/or in the cache(s) of the processor(s) 202 such that the data of the new elements (delta) is dumped into the persistent memory 206. This may be essential to guarantee that in the event of the improper unmount event the data comprising the alternate tree structure is available in the persistent memory 206 and may be retrieved during the following mount sequence to the file system 210. The management module 220 may use one or more low-level processor instructions, for example, clwb, clflushopt, clflush, and movnt, pcommit and/or the like to push the data through the cache hierarchy into the persistent memory 206.

Other low-level processor instructions may be used as appropriate depending on the architecture of the processor(s) 202. Optionally, in case asynchronous dynamic random access memory (RAM) refresh (ADR) is supported by a memory controller of the processor(s) 202, the data may be automatically flush into the persistent memory 206 during the power failure and/or system crash. In case the management module 220 fails to flush the data comprising the new elements (delta) may result in invalid elements in the alternate tree structure and/or a corrupted B-Tree.

As shown at 112, the management module 220 commits the changed B-Tree element(s) to the file system 210 to reflect the requested alteration. The management module 220 commits the changed B-Tree element(s) through the atomic operation. The simple atomic operation is atomic by nature and therefore requires no special handling while committing it into the file system 210. The atomic operation to commit the alternate tree structure into the file system 210 is comprises re-assignment of a pointer which originally pointed to the root of the original tree structure to point to the root of the alternate tree structure, i.e., the original tree structure is no longer available to file system 210. The pointer re-assignment is executed as an atomic operation that may not be interrupted by any other operation to the file system 210.

After the management module 220 commits the requested alteration by executing the atomic operation, either a simple atomic operation and/or an alternate tree structure, into the file system 210, the management module 220 flushes (pushes) the data comprising the committed operation into the persistent memory 206. The management module 220 may employ the same techniques and/or instructions as before (step 110) to verify that the data is pushed out of the volatile memory 204 and/or the cache(s) of the processor(s) 202 into the persistent memory 206. This is done to verify that the complete altered B-Tree(s) are stored in the persistent memory 206 and may be recovered in case of an improper unmount event, specifically a power failure and/or a system crush.

After the alteration is committed into the file system 210, the management module 220 may reclaim storage resources associated with one or more tree elements that are no longer used. For example, in case the alternate tree structure is created, some storage resources of the original tree structure may be reclaimed, i.e. freed for future use. Optionally, during a mount sequence of the file system 210 following the improper unmount event, the management module 220 reclaims the storage resources associated with the tree element(s) that are no longer used. For example, in case the alternate tree structure is created but failed to be committed into the file system 210, the management module 220 may reclaim the storage resources associated with the alternate tree structure, either in the dedicated reserved storage area and/or in the file system 210 itself. In case the alternate tree structure is successfully committed to the file system 210 but its storage resources reclaiming was interrupted by the improper unmount event, the management module 220 may finalize the storage resources reclaim during the mount sequence following the improper unmount event.

During the entire process 100, one or more of the clients accessing the file system 210 are permitted to access the file system 310, i.e. applying the change does not block accesses to the file system 310. Accesses to the original tree structure however may only be read accesses. Write accesses may be blocked by the management module 220 to avoid data corruption that may result from creating two alternate tree structures for a single original tree structure without synchronizing the two alternate tree structures.

Optionally, the dedicated storage space reserved for the construction of the alternate tree structure is maintained to reserve at least one memory segment the size of the maximal size of an alternate tree structure. This may be essential to be able to modify the B-Tree(s) of the file system 210 following an alteration request to remove and/or delete a file. While alteration requests to add and/or insert a file may be rejected by the management module 220 due to insufficient dedicated reserved storage space (for creating the alternate tree structure), an alteration request to remove and/or delete a file must be accepted. Since the remove and/or delete file operations may require creating the alternate tree structure, the dedicated reserved storage space must at least the size and depth of one B-Tree.

Optionally, the management module 220 stores a resources dataset, for example, a list, an array, and/or a database of the file system 210 in the volatile memory 204. This is possible since the B-Tree(s) mapping the file system 210 are stored in the high-speed persistent memory 206 and may therefore be analyzed by the management module 220 during every mount sequence to map the storage resources of the file system 210. Maintaining the resources dataset in the volatile memory 204 may significantly increase performance of the file system 210. The resources dataset that is continuously and/or frequently accessed by the management module 220 is located in the volatile memory 204 that is significantly faster compared to non-volatile memory device(s).

Optionally, the management module 220 executes balancing operations to balance one or more of the B-Trees mapping the file system 210. The balancing may allow avoiding overloaded elements that may degrade the efficiency of the management module 220 in traversing through the B-Tree 401A. The management module 220 may perform the balancing operations in the background such as not to affect runtime accesses to the file system 210. Optionally, the management module 220 may be instructed to initiate balancing operations.

Following are some examples of changes performed to one or more B-Tree(s) of the file system 210 through atomic operations, either simple atomic operation and/or through construction of the alternate tree structure(s) and/or part thereof. The alternate tree structure may include a complete B-Tree, a branch and/or a segment of a B-Tree of the file system 210.

Reference is now made to FIG. 4A, which is a schematic illustration of an exemplary file system B-Tree structure prior to an update through a simple atomic operation, according to some embodiments of the present invention. An order-4 B-Tree 401A may include a plurality of tree elements, for example, non-leaf elements (internal elements) 410 such as the non-leaf elements 410A and leaf elements (external elements) 420 such as the leaf elements 420A, 420B, 420C and 420D. As the B-Tree 401 is of order four, each element may include up to four pointer-key pairs. The pointer in each of the pairs holds a value V pointing to an associated one of the inodes in the file system 210 while the key is a numeric value identifier used for file search, sort and/or access operations through the file system 210. The keys act as separation values which divide the B-Tree 401A to subtrees (branches) allowing the management module 220 to efficiently navigate and/or traverse down the B-Tree 401A according to the keys values. The keys are assigned values such that moving to the left branch (subtree) of the B-Tree 401A will lead to B-Tree elements with pairs having key values lower than the key value of the parent pointer-key pair.

Moving to the right branch (subtree) of the B-Tree 401A will lead to B-Tree elements with pairs having key values higher than the key value of the parent node. As can be seen, the non-leaf element 410A, for example, includes three pointer-key pairs identified with keys 10, 50 and 70 and each comprising a value field storing the pointer and/or address of the associated inode. The leaf element 420A, for example, includes pointer-key pairs with key values 2 and 3 that are lower than the key value 10 of the left most node of the parent non-leaf element 410A. In the same manner, the leaf element 420B includes pointer-key pairs with key values 20, 30 and 45 that are higher than the key value 10 of the left most node of the parent non-leaf element 410A and lower than the key value 50 of the next (to the left) pointer-key pair of the parent non-leaf element 410A. The B-Tree structure may allow for efficient traversing through the tree elements 410A, 420A-420D during one or more file operations, for example, search, sort and/or access. The management module 220 may perform balancing operations to balance the B-Tree 401A such that the pointer-key pairs are distributed relatively uniformly across the B-Tree 401A.

Reference is also made to FIG. 4B, which is a schematic illustration of an exemplary file system B-Tree structure following an update through an atomic operation, according to some embodiments of the present invention. A B-Tree 401B presents the B-Tree 401A following an insertion of a new pointer-key pair with a key value of 27. A new inode associated with a pointer-key pair with key value 27 needs to be inserted at the appropriate slot and/or space (location) in the tree elements of the B-Tree 401A. Since the element 420B includes a free space for an additional pointer-key pair that is appropriate for the new pointer-key pair with key value of 27, the new pointer-key pair may be added to the element 420B. This operation does not inflict any change to the structure of the B-Tree 401A and the management module 220 may therefore execute it through a simple atomic operation resulting in an updated element 420E that is an update of the element 420B in the updated B-Tree 401B.

Figure 5A:
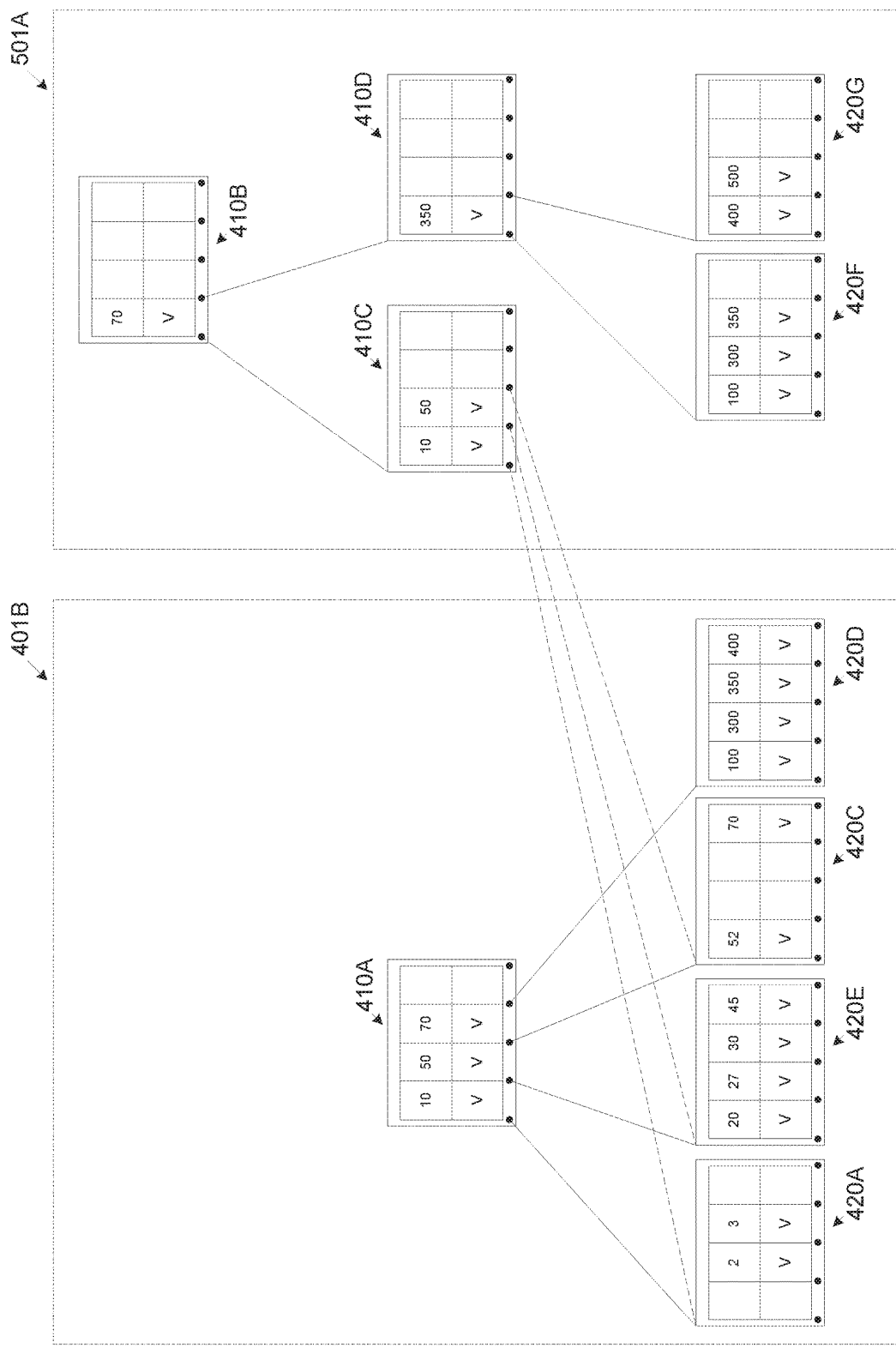
FIG. 5A is a schematic illustration of a construction of an exemplary file system alternate B–Tree structure having an added tree level, according to some embodiments of the present invention.

Reference is now made to FIG. 5A, which is a schematic illustration of a construction of an exemplary file system alternate B-Tree structure having an added tree level, according to some embodiments of the present invention. A B-Tree such as the B-Tree 401B needs to be added with an inode associated with a pointer-key pair having a key value 500. The new inode may not be added to the B-Tree 401B through a simple atomic operation since it needs to be allocated in the tree element 420D that is full, having no free pointer-key spaces. An alternate B-Tree 501A is created by a management module such as the management module 220 to add the new inode to the B-Tree 401B.

The management module 220 manipulates the entire B-Tree 401B to rearrange the elements 410A and 420D of the original B-Tree 401B in order to create the alternate B-Tree 501A. The top most non-leaf element 410A of the original B-Tree 401B is split to two levels, to include a new top most non-leaf element 410B and two new middle level elements 410C and 410D. Note that the management module 220 may take alternative options to implement the alternate tree structure 501A, however for balancing purposes the presented modification is selected. The B-Tree 501A is constructed to include only the new tree elements required to apply the insert file operation, i.e. the leaf elements 420A, 420E and 420C that are unchanged are not created in the alternate B-Tree 501A but are rather linked to the alternate B-Tree 501A to duplicate the structural relationship of the original B-Tree 401B.

Figure 5B:
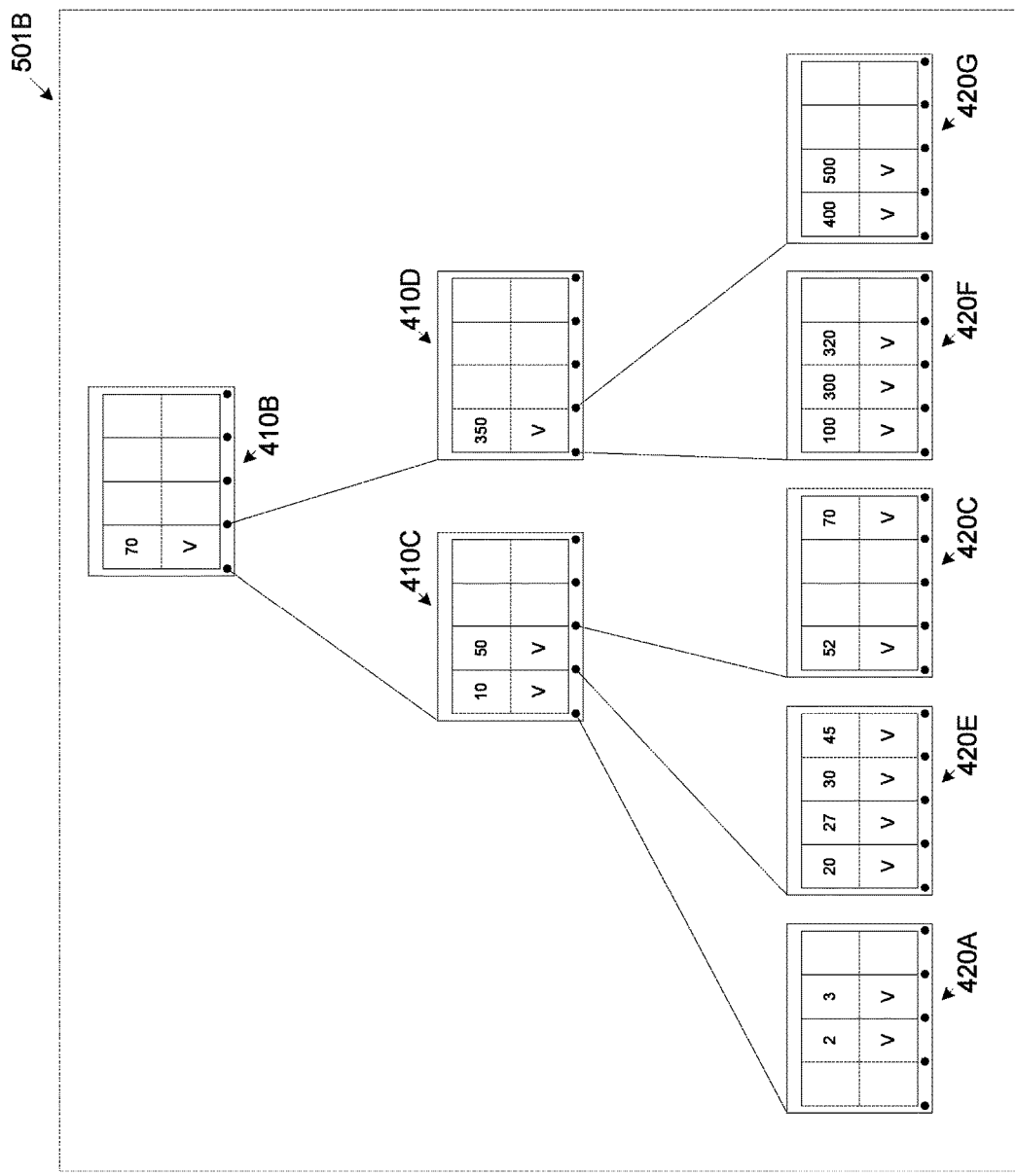
FIG. 5B is a schematic illustration of an exemplary file system B–Tree structure following commitment of an alternate B–Tree structure having an added tree level, according to some embodiments of the present invention.

Reference is also made to FIG. 5B, which is a schematic illustration of an exemplary file system B-Tree structure following commitment of an alternate B-Tree structure having an added tree level, according to some embodiments of the present invention. After the management module 220 completes construction of the alternate B-Tree 501A, the management module 220 commits the alternate B-Tree 501A into the file system 210 through the atomic pointer re-assignment operation. The pointer re-assignment atomic operation comprises setting a pointer from a root of the file system 210 to point to the element 410B instead of the original element 410A. After the pointer re-assignment, the original B-Tree 401B is no longer available in the file system 210 and a B-Tree 501B that is the result of the committed alternate B-Tree 501A is now available in the file system 210.

Figure 6A:
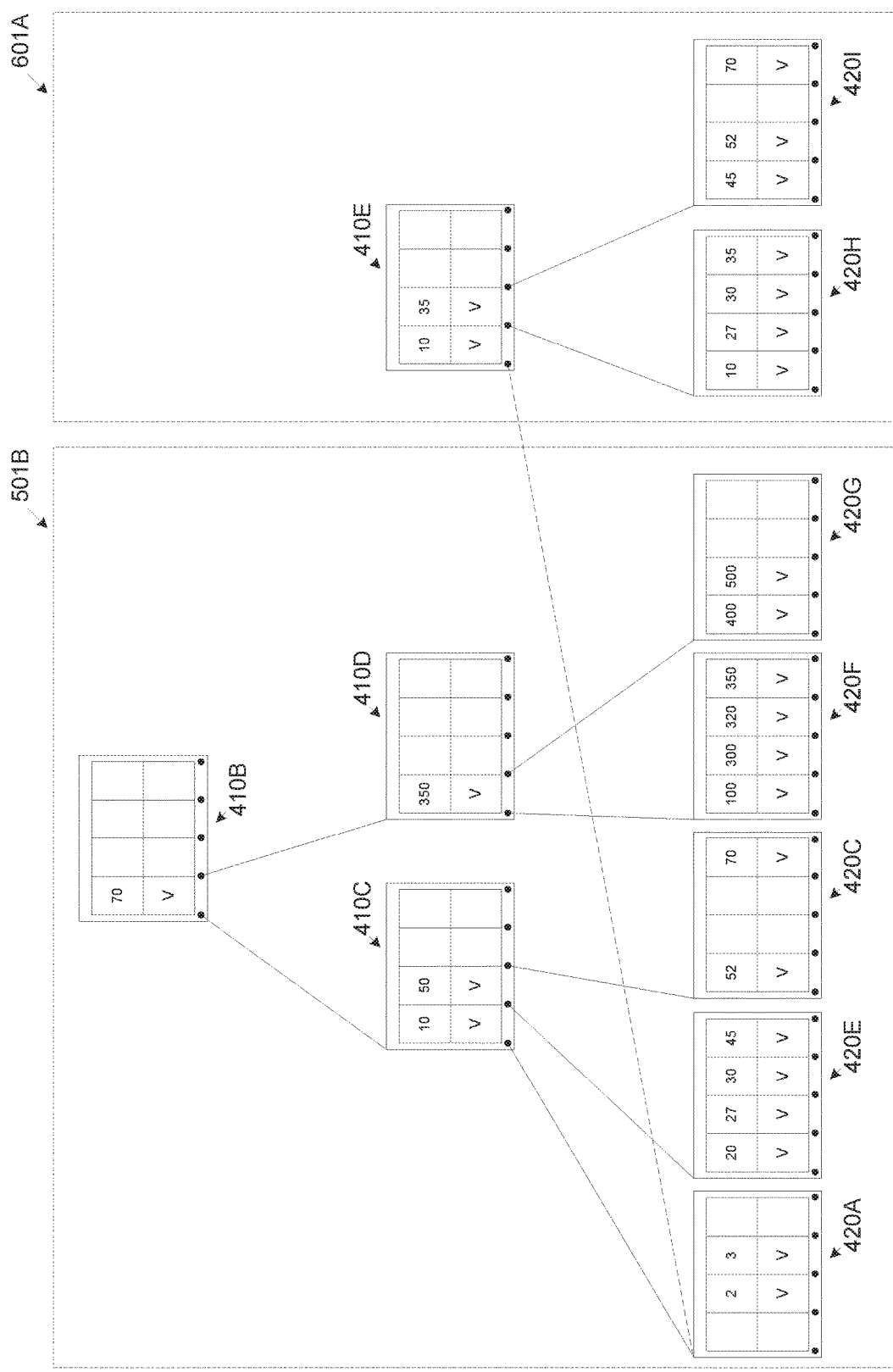
FIG. 6A is a schematic illustration of a construction of an exemplary file system alternate partial B–Tree structure, according to some embodiments of the present invention.

Reference is now made to FIG. 6A is a schematic illustration of a construction of an exemplary file system alternate partial B-Tree structure, according to some embodiments of the present invention. A B-Tree such as the B-Tree 501B needs to be added with an inode associated with a pointer-key pair having a key value 35. The new inode may not be added to the B-Tree 401B through a simple atomic operation since it needs to be allocated in the tree element 420E that is full, having no free pointer-key spaces. An alternate partial tree structure 601A is created by a management module such as the management module 220 to add the new inode to the B-Tree 501B.

The management module 220 manipulates part of the B-Tree 401B to rearrange the elements 410C, 420C and 420E of the original B-Tree 501B in order to create the alternate B-Tree 601A. The middle level element 410C is modified to rearrange the pointer-key values it holds. The leaf elements 420E and 420C are also modified to create respective leaf elements 420H and 420I to allow insertion of the new inode in the appropriate location, i.e. between inodes associated with the keys 30 and 45. The pointer-key pair having the key 45 is moved from the element 420H (corresponding to the original element 420E) to the element 420I to make room for the new inode to be inserted into the B-Tree 501B. The alternate partial tree structure 601A is constructed to include only the new tree elements required to apply the insert file operation, i.e. the leaf element 420A that is unchanged is not created in the alternate tree structure 601A but are rather linked to the alternate B-Tree 501B to duplicate the structural relationship of the original B-Tree 501B.

Figure 6B:
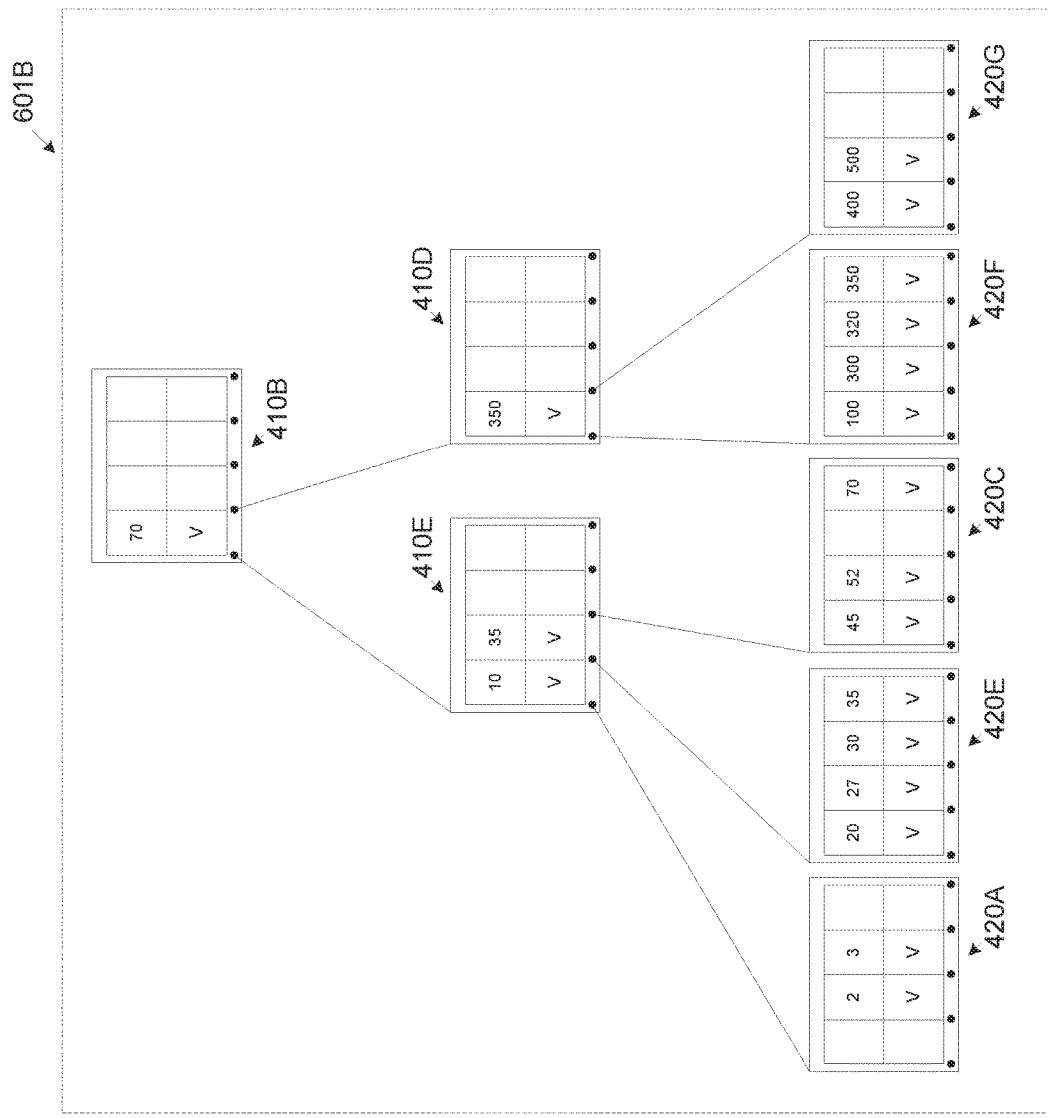
FIG. 6B is a schematic illustration of an exemplary file system B–Tree structure following commitment of an alternate partial B–Tree structure, according to some embodiments of the present invention.

Reference is also made to FIG. 6B is a schematic illustration of an exemplary file system alternate partial B-Tree structure following commitment of an alternate partial B-Tree structure, according to some embodiments of the present invention. After the management module 220 completes construction of the alternate partial B-Tree 601A, the management module 220 commits the alternate partial B-Tree 601A into the file system 210 through the atomic pointer re-assignment operation. The pointer re-assignment atomic operation comprises setting the pointer from the tree element 410B to point to the element 410E instead of the original element 410C. After the pointer re-assignment, the original B-Tree 501B is no longer available in the file system 210 and a B-Tree 601B that is the result of the committed alternate B-Tree 601A is now available in the file system 210.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method, comprising:
designating by a processor, a file system comprising a plurality of files arranged in a plurality of tree structures, said file system executed from and directly mapped to a persistent memory;
determining by the processor, whether a request to alter an altered file of the file system is executable by an atomic operation, and in response to the determination, executing the atomic operation; wherein any change due to the atomic operation is discarded when the atomic operation is executed during an unsuccessful file system unmount event;
determining by the processor that the request is executable by a non-atomic operation, and in response to the determination, creating an alternate tree structure by the processor, at a reserved area of the file system at the persistent memory; wherein the reserved area is accessible to the file system and inaccessible to any other process; and
based on execution of the non-atomic operation on the alternate tree structure, the processor using the atomic operation to commit changes to the original tree structure to the file system at the persistent memory; wherein the alternate tree structure is committed to the file system using the atomic operation for re-assigning a pointer pointing to the original tree structure to point to the alternate tree structure.

2. The computer implemented method of claim 1, wherein said persistent memory is a powered-up non-volatile dual in-line memory module (NVDIMM).

3. The computer implemented method of claim 1, wherein said plurality of tree structures are B-Trees.

4. The computer implemented method of claim 1, wherein an order of a plurality of elements of said plurality of tree structures is adapted to an elementary block size of the persistent memory wherein said order is indicative of a size of said each element.

5. The computer implemented method of claim 1, wherein an order of a plurality of elements of the plurality of tree structures is adapted to a hardware architecture of the processor based on at least one of: a width of a register and a width of a cache line.

6. The computer implemented method of claim 1, wherein the altered file is one of each of a file, a directory, a link to a file and a link to a directory.

7. The computer implemented method of claim 1, wherein the request involves a file operation selected from a create, link, remove, delete, unlink, merge and split operation.

8. The computer implemented method of claim 1, wherein said alternate tree structure is linked to unaltered files contained in said original tree structure.

9. The computer implemented method of claim 1, further comprising flushing to said persistent memory data comprising said alternate tree structure following said creation.

10. The computer implemented method of claim 1, further comprising creating a resources dataset during a mount sequence of said file system by analyzing said plurality of tree structures,
wherein based on said analysis said alternate tree structure is committed to said file system in case said alteration completed successfully prior to a latest unmount sequence, and
based on said analysis said alternate tree structure is discarded and not committed to said file system in case said alteration failed to complete prior to said unmount sequence; wherein said resources dataset resides in a volatile memory device.

11. A non-transitory machine-readable medium having stored thereon instructions for performing a method comprising machine executable code which when executed by at least one machine, causes the machine to:
designate a file system comprising a plurality of files arranged in a plurality of tree structures, said file system executed from and directly mapped to a persistent memory;
determine whether a request to alter an altered file of the file system is executable by an atomic operation, and in response to the determination, execute the atomic operation; wherein any change due to the atomic operation is discarded when the atomic operation is executed during an unsuccessful file system unmount event;
determine that the request is executable by a non-atomic operation, and in response to the determination, create an alternate tree structure at a reserved area of the file system at the persistent memory; wherein the reserved area is accessible to the file system and inaccessible to any other process; and
based on execution of the non-atomic operation on the alternate tree structure, use the atomic operation to commit changes to the original tree structure to the file system at the persistent memory; wherein the alternate tree structure is committed to the file system using the atomic operation for re-assigning a pointer pointing to the original tree structure to point to the alternate tree structure.

12. The non-transitory machine-readable medium of claim 11, wherein said persistent memory is a powered-up non-volatile dual in-line memory module (NVDIMM).

13. The non-transitory machine-readable medium of claim 11, wherein an order of a plurality of elements of said plurality of tree structures is adapted to an elementary block size of the persistent memory; wherein said order is indicative of a size of said each element.

14. The non-transitory machine-readable medium of claim 11, wherein an order of a plurality of elements of the plurality of tree structures is adapted to a hardware architecture of a processor based on at least one of: a width of a register and a width of a cache line.

15. The non-transitory machine-readable medium of claim 11, wherein said alternate tree structure is linked to unaltered files contained in said original tree structure.

16. The non-transitory machine-readable medium of claim 11, wherein the machine executable code further causes the machine to: flush to the persistent memory data comprising the alternate tree structure following the creation of the alternate tree structure.

17. The non-transitory machine-readable medium of claim 11, wherein the machine executable code further causes the machine to:
create a resources dataset during a mount sequence of said file system by analyzing said plurality of tree structures, wherein based on said analysis said alternate tree structure is committed to said file system in case said alteration completed successfully prior to a latest unmount sequence, and based on said analysis said alternate tree structure is discarded and not committed to said file system in case said alteration failed to complete prior to said unmount sequence; wherein said resources dataset resides in a volatile memory device.

18. A computing device, comprising:

a memory containing machine readable medium comprising machine executable code having stored thereon instructions;

a processor coupled to the memory, the processor configured to execute the machine executable code to cause the processor to:

designate a file system comprising a plurality of files arranged in a plurality of tree structures, said file system executed from and directly mapped to a persistent memory;

determine whether a request to alter an altered file of the file system is executable by an atomic operation, and in response to the determination, execute the atomic operation; wherein any change due to the atomic operation is discarded when the atomic operation is executed during an unsuccessful file system unmount event;

determine that the request is executable by a non-atomic operation, and in response to the determination, create an alternate tree structure at a reserved area of the file system at the persistent memory; wherein the reserved area is accessible to the file system and inaccessible to any other process; and based on execution of the non-atomic operation on the alternate tree structure, use the atomic operation to commit changes to the original tree structure to the file system at the persistent memory; wherein the alternate tree structure is committed to the file system using the atomic operation for re-assigning a pointer pointing to the original tree structure to point to the alternate tree structure.

19. The computing device of claim 18, wherein said persistent memory is a powered-up non-volatile dual in-line memory module (NVDIMM).

20. The computing device of claim 18, wherein an order of a plurality of elements of said plurality of tree structures is adapted to an elementary block size of the persistent memory; wherein said order is indicative of a size of said each element.

21. The computing device of claim 18, wherein an order of a plurality of elements of the plurality of tree structures is adapted to a hardware architecture of the processor based on at least one of: a width of a register and a width of a cache line.

22. The computing device of claim 18, wherein said alternate tree structure is linked to unaltered files contained in said original tree structure.

23. The computing device of claim 18, wherein the machine executable code further causes the machine to: flush to the persistent memory data comprising the alternate tree structure following the creation of the alternate tree structure.

24. The computing device of claim 18, wherein the machine executable code further causes the machine to:

create a resources dataset during a mount sequence of said file system by analyzing said plurality of tree structures, wherein based on said analysis said alternate tree structure is committed to said file system in case said alteration completed successfully prior to a latest unmount sequence, and based on said analysis said alternate tree structure is discarded and not committed to said file system in case said alteration failed to complete prior to said unmount sequence; wherein said resources dataset resides in a volatile memory device.

25. The computing device of claim 18, wherein said plurality of tree structures are B-Trees.

* * * * *